(12) United States Patent
Cleveland et al.

(10) Patent No.: US 6,323,483 B1
(45) Date of Patent: Nov. 27, 2001

(54) HIGH BANDWIDTH RECOILESS MICROACTUATOR

(75) Inventors: Jason P. Cleveland, Ventura, CA (US); David Grigg, Glastonbury, CT (US)

(73) Assignee: Veeco Instruments Inc., Plainview, NY (US)

( * ) Notice: Subject to any disclaimer, the term of this patent is extended or adjusted under 35 U.S.C. 154(b) by 0 days.

(21) Appl. No.: 09/399,388

(22) Filed: Sep. 20, 1999

(51) Int. Cl.$^7$ ........................................... H01J 49/00
(52) U.S. Cl. ................... 250/306; 250/307; 250/442.11; 310/316
(58) Field of Search ..................... 250/306, 307, 250/442.11, 440.11; 310/311, 312, 316, 338, 448

(56) References Cited

U.S. PATENT DOCUMENTS

| | | |
|---|---|---|
| 5,198,715 | 3/1993 | Elings et al. . |
| 5,424,596 | 6/1995 | Mendenhall et al. . |
| 5,479,386 | 12/1995 | Takeshita et al. . |
| 5,557,156 | * 9/1996 | Elings ................................. 250/306 |

* cited by examiner

*Primary Examiner*—K. Nguyen
(74) *Attorney, Agent, or Firm*—Nilles & Nilles, S.C.

(57) ABSTRACT

The bandwidth of a microactuator for a surface modification instrument or a surface measurement instrument is improved by inertially-balancing the microactuator to prevent the transfer of any net forces from the microactuator to its support structure by counteracting momentum generated upon operation of the microactuator, thereby inhibiting induced resonances in the support structure. Net force transfer prevention can be achieved using either 1) a multi-actuator assembly including a primary microactuator and a counteracting actuator operating substantially out-of-phase with respect to the primary microactuator, or 2) a single microactuator mounted on the microactuator's support structure so as to prevent momentum transfer to the support structure during microactuator operation. The instrument also preferably includes high internal damping to minimize the effect of any slight inertial misbalances on instrument operation.

35 Claims, 5 Drawing Sheets

HIGH BANDWIDTH RECOILESS MICROACTUATOR

BACKGROUND OF THE INVENTION

1. Field of the Invention

The invention relates to microactuators that are capable of positioning objects on extremely fine-length scales. More specifically, the invention relates to instruments utilizing microactuation for positioning objects with subnanometer precision. The invention is useful in fields ranging from surface measurement applications such as scanning probe microscopy to surface modification applications such as single point diamond turning.

2. Discussion of the Related Art

As miniaturization of components in a wide range of devices hastens, the need for positioning objects such as probes and tools precisely and quickly on smaller and smaller length scales correspondingly increases. This trend is very important in surface modification instruments, because smaller and smaller devices are being built, requiring high precision, stability, and speed. For example, some diamond turning machines must be capable of machining parts to within subnanometer tolerances. This trend is equally important in measuring instruments, such as profilometers and scanning probe microscopes (SPMs) including atomic force microscopes (AFMs) and magnetic force microscopes (MFMs), that measure topography and other and subsurface surface characteristics of samples. In fact, the need for precision in measuring instruments is even more acute, given the fact that the instruments must be capable of rapidly resolving dimensions smaller than those being fabricated in order to assure manufacturing quality and accurate diagnoses of manufacturing problems. In short, the measuring instrument must have higher resolution and precision than that of the fabrication device. For the sake of convenience, the discussion that follows will focus on AFMs, it being understood that the problems addressed and solved by the invention are also experienced by other measurement instruments, a wide range of surface modification instruments, and other microactuated devices.

The typical AFM includes a probe which includes a flexible cantilever and a tip mounted on the free end of the cantilever. The probe is mounted on a scanning stage that is typically mounted on a common support structure with the sample. The scanning stage includes an XY actuator assembly and a Z actuator. The XY actuator assembly drives the probe to move in an X-Y plane for scanning. The Z actuator, which is mounted on the XY actuator assembly and which supports the probe, drives the probe to move in a Z axis extending orthogonally to the X-Y plane.

AFMs can be operated in different modes including contact mode and TappingMode. In contact mode, the cantilever is placed in contact with the sample surface, and cantilever deflection is monitored as the tip is dragged over the sample surface. In TappingMode (Tapping and TappingMode are trademarks of Veeco Instruments Inc.), the cantilever is oscillated mechanically at or near its resonant frequency so that the tip repeatedly taps the sample surface or otherwise interacts with the sample, reducing the cantilever's oscillation amplitude. U.S. patents relating to Tapping and TappingMode include U.S. Pat. Nos. 5,266,801, 5,412,980 and 5,519,212, by Elings et al.

In any operational mode, interaction between the probe and the sample induces a discernable effect on a probe operational parameter, such as cantilever deflection oscillation amplitude, phase or frequency, that is detectable by a sensor. The resultant sensor-generated signal is used as a feedback control signal for the Z actuator to maintain a designated probe operational parameter constant. In contact mode, the designated parameter may be cantilever deflection. In TappingMode, the designated parameter may be oscillation amplitude, phase or frequency. The feedback signal also provides a measurement of the surface characteristic of interest. For example, in TappingMode, the feedback signal is used to maintain the amplitude of probe oscillation constant to measure the height of the sample surface or other sample characteristics.

During AFM operation, the maximum data acquisition rate is dependent to a large extent on the bandwidth of the feedback loop for the Z actuator. For instance, a Z actuator controlled by a feedback loop having a one KHz bandwidth is capable of following 1,000 surface oscillations per second. Historically, it was commonly thought that the resonance of the Z actuator was the greatest limiting factor on the bandwidth of the feedback loop. Prior efforts at increasing Z feedback loop bandwidth therefore focused on increasing the resonant frequency of the Z actuator. However, the inventors have realized that bandwidth is also limited by induced resonant motions in other components of the AFM during feedback control of the Z actuator.

A typical AFM has a mechanical loop extending from the sample support structure, through the support structure for the scanning stage, through the XY actuator assembly of the scanning stage, and to the Z actuator. The bandwidth limitation of the AFM is typically equal to the lowest excited natural frequency of the subcomponents of the AFM's mechanical loop. The inventors have therefore identified the need to eliminate induced motion in the supporting structure for a microactuator. However, heretofore, this need has not been previously satisfied.

OBJECTS AND SUMMARY OF THE INVENTION

It is therefore a first principal object of the invention to provide a method of increasing the bandwidth of a microactuator of a device such as a machine tool for fabricating small parts or a measuring instrument that measures parts machined by such a tool.

Another object of the invention is to provide a method that meets the first principal object and that is simple, yet effective.

In accordance with a first aspect of the invention, this object is achieved by preventing the transfer of any substantial net forces from the microactuator to its support structure, thereby increasing the instrument's bandwidth by inhibiting induced resonances in the support structure.

Net force transfer prevention can be achieved using either 1) a multi-actuator assembly including a primary actuator and a counteracting actuator operating essentially out-of-phase with respect to the primary actuator, or 2) a single actuator mounted on the support structure so as to prevent momentum transfer to the actuator's support structure during actuator operation. Both techniques prevent significant momentum transfer from the microactuator to the support structure.

Another object is to provide a method that meets the first principal object and that is usable with piezoelectric actuators.

In accordance with another aspect of the invention, the piezoelectric actuator(s) is mounted on its support structure via opposing mounts and is configured to expand and contract without transferring momentum to its support structure.

Still another object of the invention is to provide a method that meets the second principal object and that retains as much of the effective range of the microactuator as possible while still minimizing momentum transfer to the microactuator's support structure.

In accordance with another aspect of the invention, this object is achieved by mounting the microactuator on or in its support structure by spaced deflectable mounts having different stiffnesses in order to permit the displacement amplitude of the end of the microactuator bearing the probe or other translated object to be greater than the displacement amplitude of the opposed end of the microactuator. Inertial balance is maintained by increasing the weight of the mass moving with the opposed end of the microactuator relative to the mass moving with the object-bearing end of the actuator so as to satisfy the equation: $M1V1=M2V2$.

Yet another object of the invention is to provide a method that meets the first principal object and that minimizes the effects of any slight actuator misbalances.

In accordance with another aspect of the invention, this object is achieved by damping actuator oscillations, preferably using a polymer damper in contact with the actuator.

A second principal object of the invention is to provide an instrument with an improved bandwidth in a microactuator control loop thereof.

This object is achieved by providing a probe-based instrument having a Z actuator configured as described above in conjunction with the first principal object.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not the limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENT

1. Resume

Pursuant to the invention, the frequency bandwidth of a microactuator for a device such as a surface modification instrument or a surface measurement instrument is improved by inertially-balancing the microactuator to prevent the transfer of any net forces from the microactuator to its support structure by counteracting momentum generated upon operation of the microactuator, thereby reducing induced resonances in the support structure. Net force transfer prevention can be achieved using either 1) a multi-actuator assembly including a primary microactuator and a counteracting actuator operating substantially out-of-phase with respect to the primary microactuator, or 2) a single microactuator mounted on the support structure so as to prevent momentum transfer to the microactuator support structure during microactuator operation. The instrument also preferably includes high internal damping to minimize the effect of any slight inertial misbalances on instrument operation.

2. System Overview

The present invention is applicable to any instrument requiring rapid microactuation such as those for rapid, highly precise surface modification or surface measurement. Specifically, the invention relates to instruments which maintain a designated operational parameter to provide a measurement of a surface sample characteristic such as topography or to perform a designated machining function such as diamond turning. Examples of these instruments includes profilometers, magnetic force microscopes, atomic force microscopes (AFMs), fast tool servo machines, and robotic controls. Hence, while the invention is described primarily in conjunction with the control of a Z actuator for an AFM for the sake of convenience, it is applicable to microactuators used in a wide range of other surface modification instruments and surface measurement instruments as well.

Figure 1:
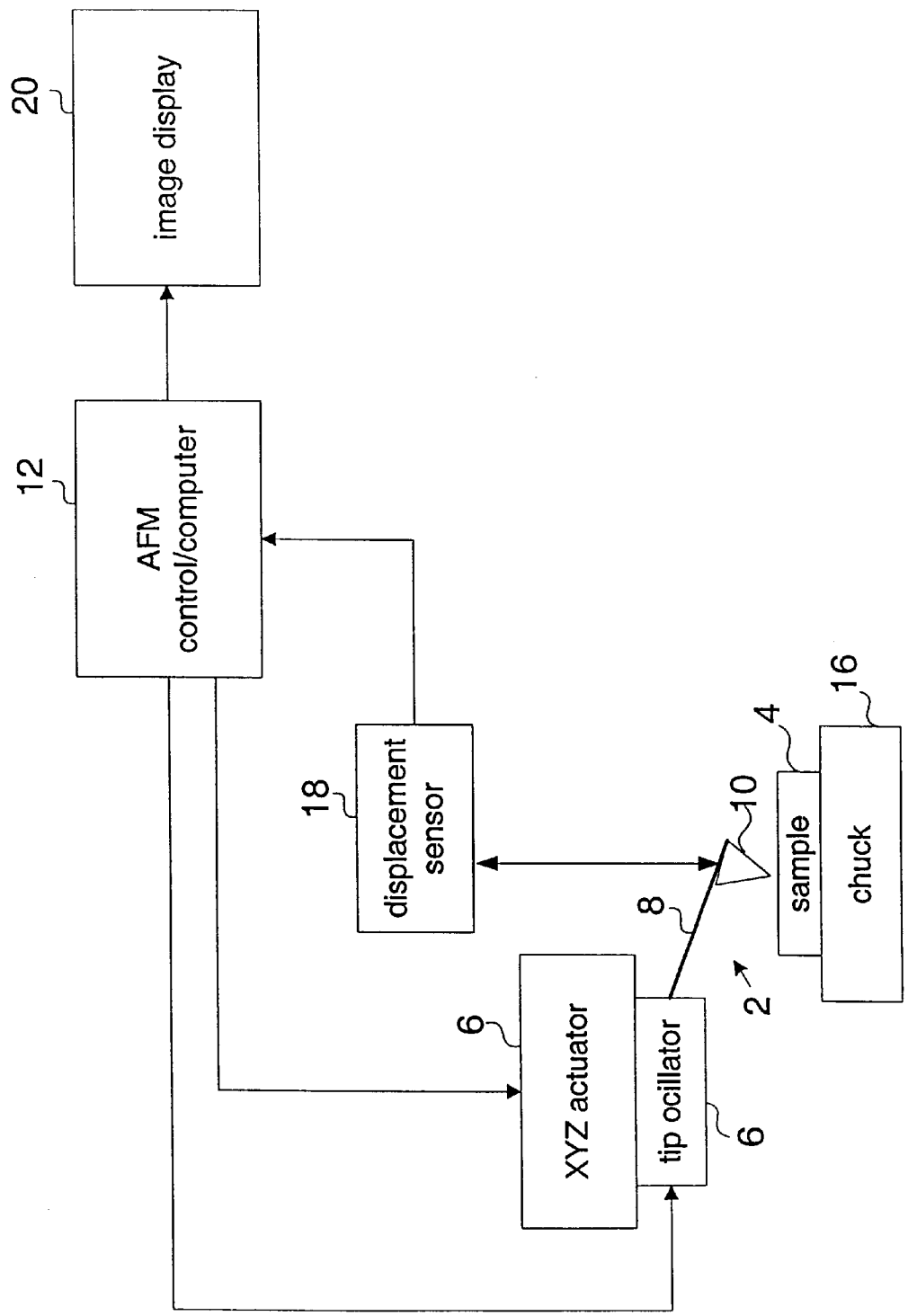
FIG. 1 schematically illustrates an AFM incorporating a preferred embodiment of the present invention.

Referring to FIG. 1, an AFM to which the invention is applicable includes a probe 2 which scans a sample 4 by intermittent or other contact, or other interaction with it, or by using a technique such as TappingMode. The probe 2 can be oscillated by a tip oscillator 6 to drive the probe 2 appropriately, usually at or near the probe's resonant frequency. The probe 2 includes 1) a cantilever 8 having a base fixed to the oscillator 6 and a free end, and 2) a tip 10 mounted on the free end of the cantilever 8. An electronic signal is applied, under control of an AFM control/computer 12, from an AC signal source (not shown) to the oscillator 6 to drive the probe 2 to oscillate at a free oscillation amplitude $A_o$ (assuming that the AFM is operating in TappingMode or other oscillatory mode). The probe 2 can also be driven towards and away from the sample 4 using a suitable XYZ actuator assembly 14 which is also controlled by the computer 12. It should be noted that rather than being configured for driving the probe 2 towards the sample 4 as illustrated, the AFM could be configured for mounting the sample 4 on a movable X-Y stage 16 so that the X-Y stage can be used to translate the sample 4 relative to the probe 2 and the actuator assembly 14 is free to simply perform scanning motions. Probe movement is monitored by a suitable displacement sensor 18 that may, for example, employ a laser and photodetector as well as other components. As is known in the art, the signals from the sensor 18 can be used to determine probe oscillation amplitude, frequency, and phase, as well as other parameters, and so measure the probe-sample interaction. The computer 12 can use this measurement as a feedback signal to control the vertical probe-sample position via the actuator assembly 14 so as to keep the probe-sample interaction constant as the actuator scans the probe laterally over the sample surface in an X-Y plane. In this feedback mode, the voltage or signal applied to the Z (vertical) portion of the actuator assembly 14 is representative of a surface characteristic of interest such as surface topography. Recording this signal as a function of scan position yields a data scan representative of the surface characteristic of interest. Finally, a suitable image display device 20 is connected to the computer 12 and displays a humanly-discernible image (such as a video image) of an output signal.

Figure 2:
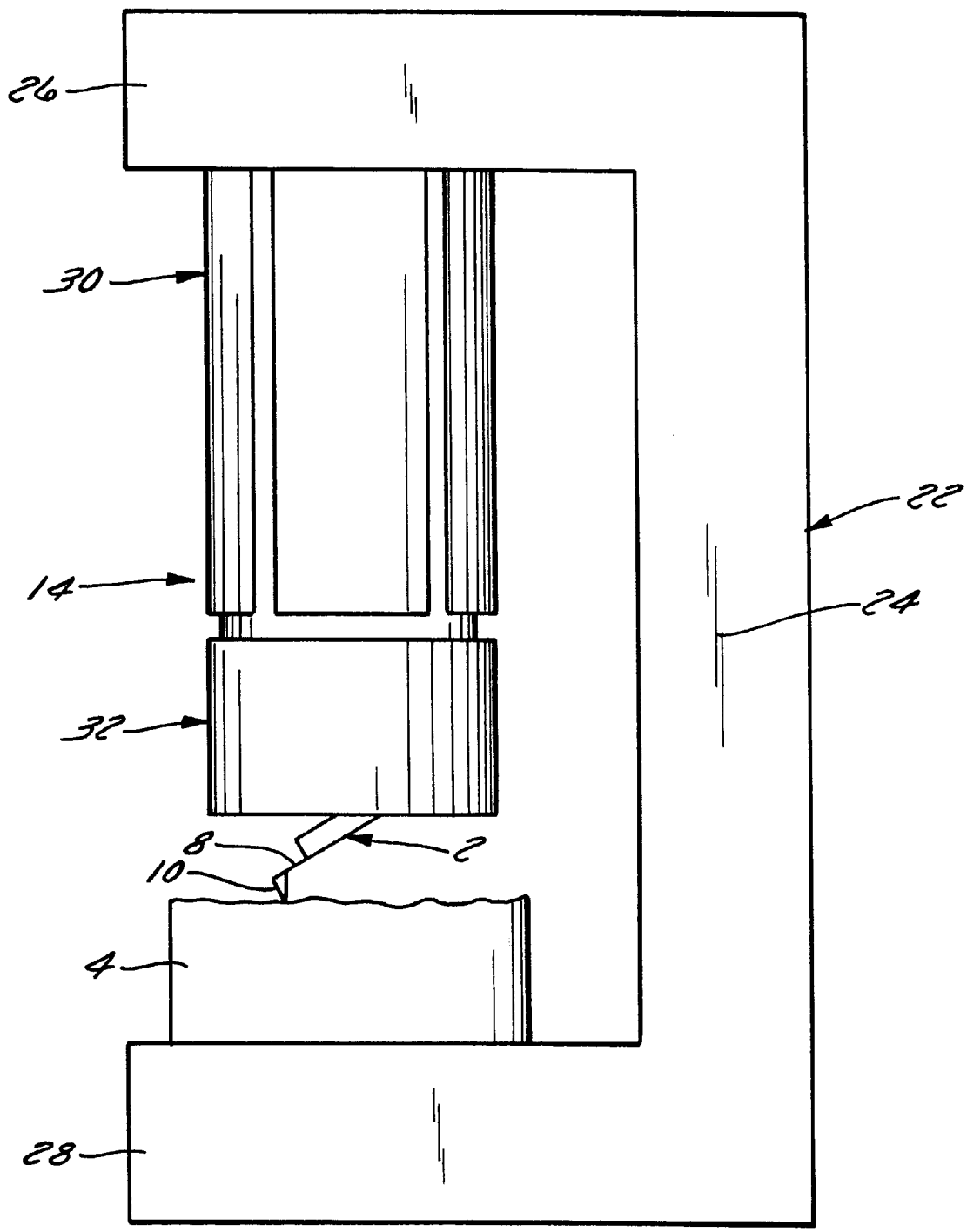
FIG. 2 illustrates the structural components of the AFM of FIG. 1 somewhat less schematically than they are illustrated in FIG. 1.

Turning now to FIG. 2, the mechanical components of the AFM include a support frame 22, the XYZ actuator assembly 14, and the probe 2. The support frame 22 is generally C-shaped so as to have a vertical leg 24, an upper horizontal leg 26 supporting the XYZ actuator assembly 14, and a lower horizontal leg 28 supporting the sample 4. The XYZ actuator assembly 14 may comprise any electrically-operated actuator effecting precisely-controlled displacement of the probe in the X, Y, and Z directions. The illustrated assembly 14 employs piezoelectric actuators, preferably piezoelectric tube actuators for this purpose. These actuators include an XY actuator assembly 30 and a Z actuator assembly 32 which includes the microactuator of the exemplified instruments. The XY actuator assembly 30 has an upper end which is mounted to the upper horizontal leg 26 of the support frame 22 and has a bottom end. The Z actuator assembly 32 has an upper end which is mounted on the bottom end of the XY actuator assembly 30 and has a bottom end which supports the probe 2.

As is evident in FIG. 2, a mechanical "loop" extends from the Z actuator assembly 32, to the XY actuator assembly 30, through the support frame 22, and to the sample 4. Discounting other factors not applicable to this invention, the bandwidth limitation of the AFM is equal to the lowest natural frequency of the subcomponents of this mechanical loop. In recognition of this fact, the invention incorporates measures to eliminate or at least minimize the transfer of forces from the microactuator of the Z actuator assembly 32 to the XY actuator assembly 30 during operation of the Z actuator assembly 32. Several nonlimiting embodiments of microactuators configured to achieve this effect now will be described.

3. Theoretical Two-Actuator Assembly

Figure 3:
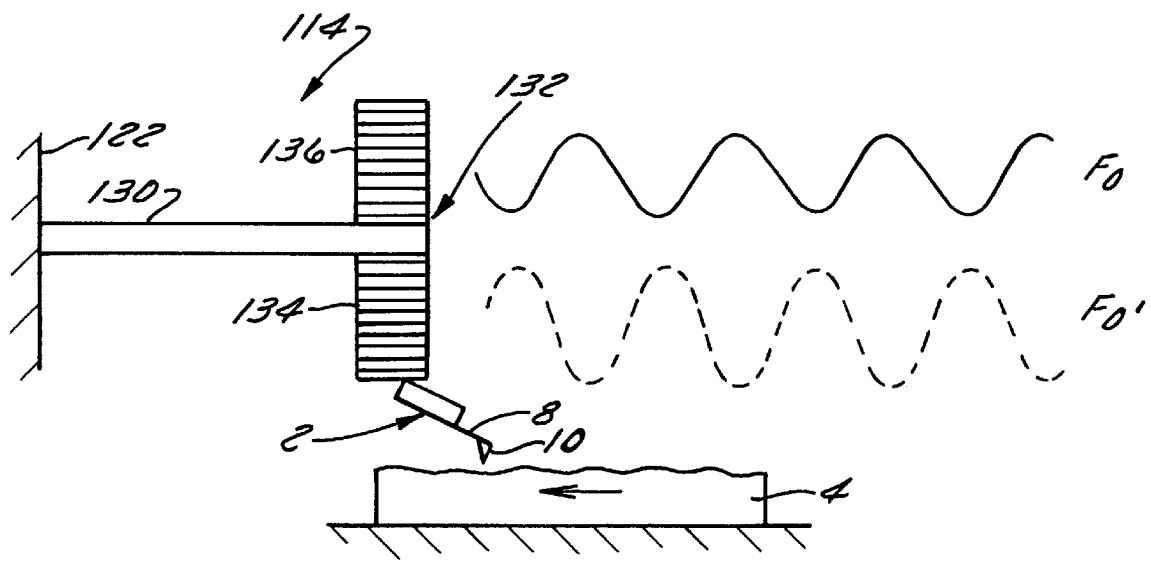
FIG. 3 schematically illustrates a theoretical arrangement for preventing the transfer of net forces from a Z actuator assembly of the AFM of FIGS. 1 and 2 to its support structure.

Turning now to FIG. 3, an AFM of the type described in Sections 1 and 2 above is schematically modeled. In this instrument, the support frame 122 is assumed to be a rigid structure of infinite mass, the XY actuator assembly 130 of the XYZ actuator assembly 114 is illustrated as a cantilever the base of which is mounted on the rigid structure 122, and the Z actuator assembly 132 of the assembly 114 includes a primary Z actuator 134 serving as the microactuator of the AFM and a counteracting Z actuator 136 which are mounted on the bottom and top surfaces of the free end of the cantilever, respectively. The probe 2 is mounted on the bottom surface of the primary Z actuator 134 so as to move vertically upon expansion and contraction of the primary Z actuator 134. Hence, as the instrument is scanned over a sample surface having an irregular profile, energizing current is supplied to the primary Z actuator 134 under feedback to raise and lower the probe 2 commensurately with surface variations. The energizing current supplied to the primary Z actuator 134 is represented by a generally sinusoidal curve $F_o$ in FIG. 3.

The counteracting Z actuator 136 is driven so as to impose forces on the XY actuator assembly 114 which counteract the forces imposed on the XY actuator assembly by the primary Z actuator 134. In the illustrated example in which the energizing current for the primary Z actuator 134 follows the generally sinusoidal curve $F_o$, the curve $F_o'$ of the energizing current for the counteracting Z actuator 136 has the same amplitude and frequency as the curve $F_o$ but is shifted by 180° relative to the curve $F_o$. As a result, the two Z actuators 134 and 136 inertially balance each other so that no net forces are imposed on the XY actuator assembly 130. Hence, feedback control occurs without inducing resonances in the XY actuator assembly 130. The sum of $F_0$ and $F_0'$ should be as close to zero as possible.

4. Practical Two-Actuator Assembly

Figure 4:
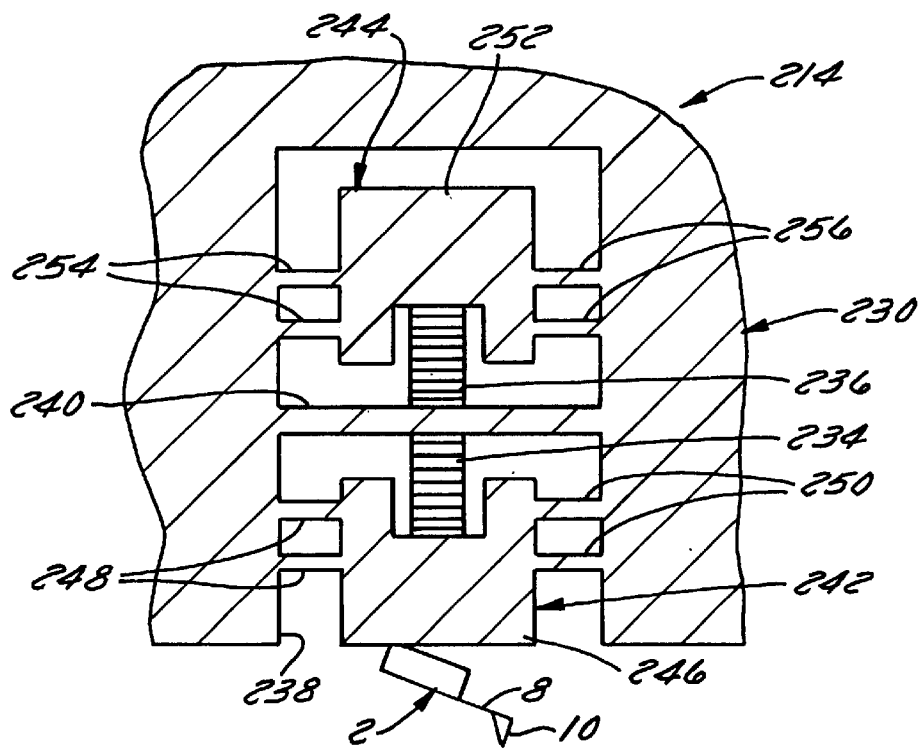
FIG. 4 is a sectional elevation view illustrating a first practical embodiment of a portion of an actuator assembly including a microactuator configured to achieve the effect of the theoretical assembly of FIG. 3.

A comparison of FIGS. 2 and 3 reveals that the Z actuator assembly 132 illustrated in FIG. 3 is not easily usable with a piezoelectric tube-type XYZ actuator assembly of the type illustrated in FIG. 2 because an XY tube actuator assembly is not cantilevered in a manner conducive to the mounting of two counteracting Z actuators on it. A more practical arrangement for achieving the same or similar effect is illustrated in FIG. 4 in which an XY actuator assembly 230 of a XYZ actuator assembly 214 is configured with a cavity 238 in which a Z actuator assembly 232 is disposed. The Z actuator assembly 232 includes a first or primary Z actuator 234, serving as the instrument's microactuator a second or counteracting Z actuator 236, a center cross beam 240, and lower and upper deflectable mounts 242 and 244. The cross beam 240 functions in the same manner as the cantilevered end of the XY actuator assembly 130 in FIG. 3 to the extent that it receives reaction forces from the primary Z actuator 234 (similar to 134 in FIG. 3) during Z actuator operation. A first end of the primary Z actuator 234 is mounted on the beam 240, and a second end of the primary Z actuator 234 is mounted on the first deflectable mount 242. The first deflectable mount 242 includes 1) a relatively rigid center mounting structure 246 and 2) a pair of laterally opposed hinge sets 248 and 250 extending from opposite sides of the support structure 246 to an adjacent peripheral surface of the cavity 238. In the illustrated embodiment, each hinge set 248 and 250 contains a pair of vertically spaced, laterally extending flexible hinges that 1) are formed integrally with the rigid mounting structure 246 and with the support structure of the XY actuator assembly 230 and 2) are configured to flex upon extension and retraction of the primary Z actuator 234 to permit vertical movement of the mounting structure 246 within the cavity 238. The probe 2 is mounted on the bottom surface of the mounting structure 246 so as to move vertically with the mounting structure 246 upon primary Z actuator energization.

The counteracting Z actuator 236 constitutes a mirror image of the primary Z actuator 234. It has a first end connected to the top surface of the beam 240 and a second end connected to the upper deflectable mount 244. The upper deflectable mount 244, like the lower deflectable mount 242, includes 1) a central, relatively rigid mounting structure 252 and 2) first and second laterally opposed hinge sets 254 and 256 each of which includes a pair of vertically spaced flexible hinges.

The aggregate mass M1 of the primary Z actuator 234, its corresponding deflectable mount 242, and the probe 2 equals the aggregate mass M2 of the counteracting Z actuator 236 and its deflectable mount 244. Similarly, the aggregate stiffness K1 of the hinge sets 248 and 250 of the first deflectable mount 242 equals the aggregate stiffness K2 of the hinge sets 254 and 256 of the second deflectable mount 244. As a result of this arrangement, when equal and opposite energizing currents are supplied to the Z actuators 234 and 236 much as discussed in Section 3 above, equal and opposite forces are imposed on the opposite sides of the beam 240. The much smaller forces imposed on the remainder of XY actuator assembly 230 by the hinge sets 248, 250, 254, and 256 similarly cancel each other out. As a result, and as in the first embodiment, no significant net forces are imposed on the XY actuator assembly 230, and no significant resonances are induced. Stated another way:

$$M1K1=M2K2$$

where:
- M1 is the aggregate mass of the primary Z actuator 234, its associated deflectable mount 242, and the probe 2;
- K1 is the aggregate stiffness of the hinge sets 248 and 250;
- M2 is the aggregate mass of the counteracting Z actuator 236 and its associated deflectable mount 244; and
- K2 is the aggregate stiffness of the hinge sets 254 and 256.

In use, displacement Z and velocity V of the opposed ends of the Z actuator assembly 230 are directly proportional to the masses and stiffnesses of those ends. Hence, $M1V1=M2V2$. Inertial balance therefore is obtained with a resultant prevention of net force transfer to the XY actuator assembly 230.

This two-actuator approach has significant beneficial characteristics. For instance, due to the fact that the upper end of the primary Z actuator 234 is arrested from movement due to its contact with the rigid beam 240, the full range of primary Z actuator movement translates into movement of the mounting structure 246 and, hence, into corresponding movement of the probe 2. The full range of primary Z actuator movement therefore can be used to track surface height variations, thereby permitting measurements such as profilometery of surfaces with relatively large height variations. Second, mismatches in deflectable mount masses or hinge characteristics can be compensated for by feeding different gains to the primary and counteracting Z actuators 234 and 236 to achieve the desired force balancing.

5. First Single-Actuator Assembly

Figure 5:
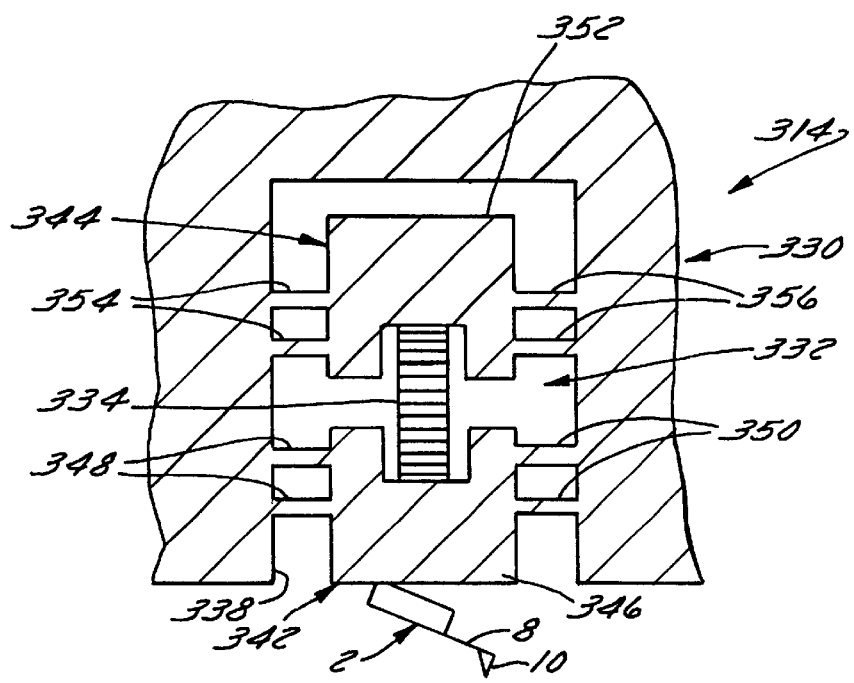
FIG. 5 is a sectional elevation view of a portion of an actuator assembly including a microactuator constructed in accordance with a second practical embodiment of the invention.

Referring to FIG. 5, a portion of an XYZ actuator assembly 314 is illustrated that has an XY actuator assembly 330 configured as discussed above in conjunction with FIG. 4 and that has a single-actuator Z actuator assembly 332. The Z actuator assembly 332 comprises 1) a single Z actuator 334 serving as the instrument's microactuator and 2) upper and lower matched deflectable mounts 342 and 344 which mount the Z actuator 334 in a cavity 338 in the XY actuator 330. As in the embodiment of FIG. 4, the lower deflectable mount 342 includes 1) a rigid central mounting structure 346 and 2) first and second laterally opposed hinge sets 348 and 350 each of which includes two vertically spaced flexible hinges. Also as in the embodiment of FIG. 4, the upper deflectable mount 344 includes 1) a rigid central mounting structure 352 and 2) first and second laterally opposed hinge sets 354 and 356 each of which includes two vertically spaced flexible hinges. The upper end of the Z actuator 334 is affixed to a downwardly-facing surface of the mounting structure 352 of the upper deflectable mount 344, and the lower end of the Z actuator 334 is affixed to an upwardly-facing surface of the mounting structure 346 of the lower deflectable mount 342. The aggregate stiffness K1 of the hinge sets 348 and 350 of the lower mount 342 equals the aggregate stiffness K2 of the hinge sets 354 and 356 of the upper mount 344. Similarly, the aggregate mass M1 of the lower mount 342 and the lower end of actuator 334 (including the relatively negligible mass of the probe 2) equals the aggregate mass M2 of the upper mount 344 and the upper end of the actuator 334. Hence, the equation $M1K1=M2K2$ is satisfied.

In use, the displacement velocities V1 and V2 of the upper and lower ends of the Z actuator 334 are equal and opposite due to the fact that $M1K1=M2K2$. As a result, the equation $M1V1=M2V2$ is satisfied. No significant net forces are imposed on the XY actuator assembly 330.

6. Second Single-actuator Assembly

Figure 6:
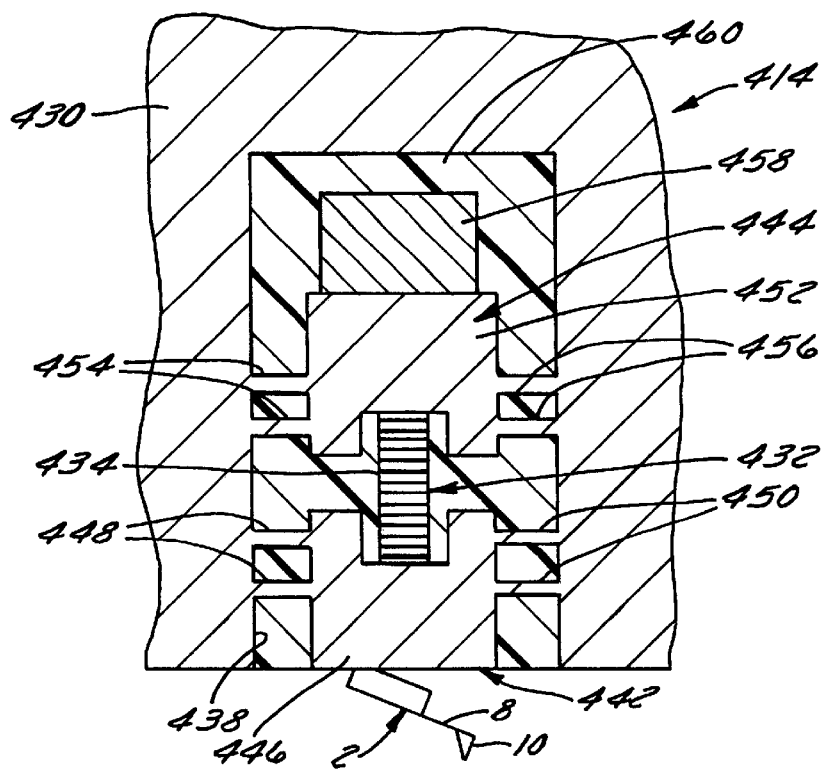
FIG. 6 is a sectional side elevation view of a portion of an actuator assembly including a microactuator constructed in accordance with a third practical embodiment of the invention.

In another embodiment of the present invention, the center of mass of the Z actuator assembly can move without imparting any forces on the XY actuator assembly if masses and stiffnesses are configured to inertially balance the Z actuator assembly. An XYZ actuator assembly 414 configured to achieve this effect is illustrated in FIG. 6. Assembly 414 includes 1) an XY actuator assembly 430 configured as discussed above in conjunction with FIGS. 4 and 5 and 2) a single-actuator, inertially-balanced Z actuator assembly 432 with a movable center of mass. The Z-actuator assembly 432 includes 1) a single Z actuator 434 serving as the instrument's microactuator and 2) upper and lower deflectable mounts 442 and 444 mounting the Z actuator 434 in a cavity 438 of the XY actuator assembly 430. As in the embodiment of FIG. 5, the deflectable mount 442 includes 1) a rigid central mounting structure 446 and 2) first and second laterally opposed sets 448 and 450 of flexible hinges each of which includes two vertically spaced hinges. Also as in the embodiment of FIG. 5, the upper deflectable mount 444 includes 1) a rigid central mounting structure 452 and 2) first and second laterally opposed sets 454 and 456 of flexible hinges each of which includes two vertically spaced hinges. The upper end of the Z actuator 434 is affixed to a downwardly-facing surface of the mounting structure 452 of the upper deflectable mount 444, and the lower end of the Z actuator 434 is affixed to an upwardly-facing surface of the mounting structure 446 of the lower deflectable mount 442. The probe 2 is mounted on the bottom surface of the mounting structure 446 of the lower mount 442.

In this embodiment, the hinge sets 454 and 456 of the upper deflectable mount 444 are substantially stiffer than the hinge sets 448 and 450 of the lower deflectable mount 442 so that K1 is less than K2. As a result of this arrangement, the lower end of the Z actuator 434 moves substantially more than the upper end upon energization of the Z actuator. As a practical matter, the range of motion of the lower end of the Z actuator and, hence, the range of probe motion, increases by about 50% when compared to the same actuator configured to have equal hinge thicknesses as illustrated in FIG. 5. The effective range of a typical piezoelectric actuator therefore increases from about five microns to about seven-to-eight microns.

Figure 7A:
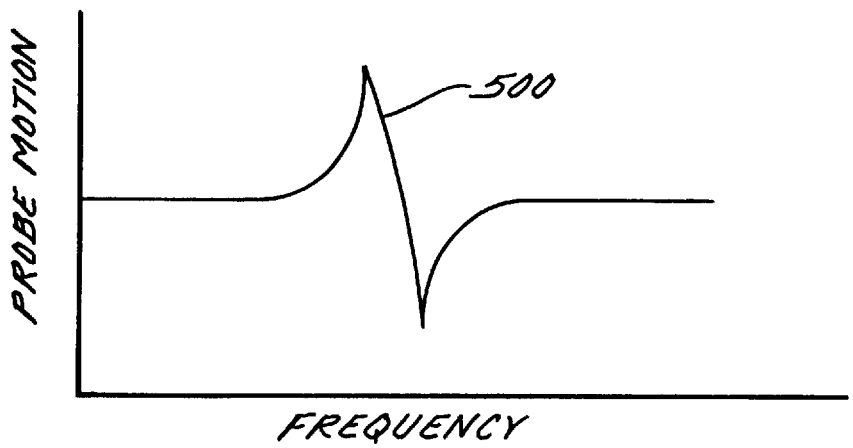
FIGS. 7A through 7C are frequency response diagrams illustrating the response of various microactuator masses to changes in excitation frequency.
Figure 7B:
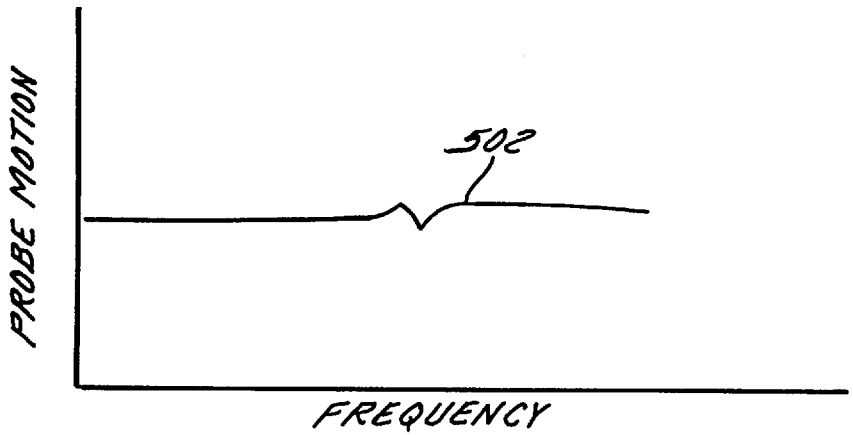
Figure 7C:
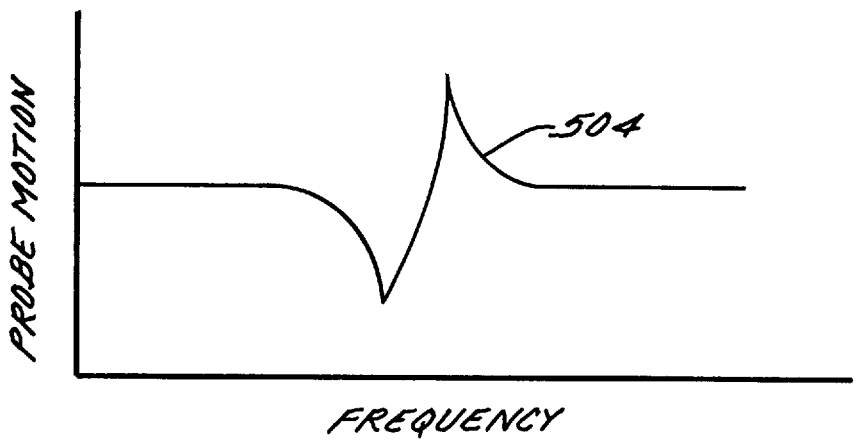

In order to balance momentum and prevent net force transfer to the XY actuator subassembly 430, mass must be added to the structure moving with the upper end of the Z actuator 434 so that $M1K1=M1K2$, and $M1V1=M2V2$. This mass preferably takes the form of a weight 458 which is mounted on top of or within the upper deflectable mount 444. The mass of the weight 458 can be determined and tuned empirically during AFM operation by closely monitoring the frequency response of the AFM as mass is incrementally added to or removed from the weight 458. This technique is illustrated graphically in the family of frequency response curves in FIGS. 7A through 7C which are obtainable using a frequency analyzer to monitor the instrument's response to changes in drive frequency while the cantilever interacts with a surface. FIG. 7A illustrates a resonance/antiresonance curve 500 which results from using too much mass in weight 458. FIG. 7C illustrates an antiresonance/resonance curve 504 which results from using too little mass in weight 458. FIG. 7B illustrates a curve 502 in which the weight 458 has the mass M2 required to satisfy the equation $M1V1=M2V2$, in which case resonances are substantially avoided.

Some mass or spring rate mismatches may occur even in the most carefully-designed systems with resultant loss of inertial balance. The adverse effects of these slight mismatches on instrument operation can be greatly reduced by internally damping actuator assembly vibrations using a damping material in contact with upper and lower surfaces of the Z actuator assembly 432. In the illustrated embodiment, this effect is achieved by filing the voids of the cavity 438 in the XY actuator assembly with a damping material such as a relatively compressible polymer material 460 such as RTV Silicone. As a result of this arrangement, the induced resonant oscillation of the XY actuator assembly 430 has a smaller peak amplitude and a broader frequency range. Ring-down time, i.e., the period of time between the initial resonance and the end of oscillation, also is greatly reduced.

The damping effects of the polymer material 460 can be maximized by placing additional damping material at other points in the mechanical loop such as within the upper end of the XY actuator assembly 430 and within voids in the AFM's frame (not shown). Hence, all structural resonances within the instrument are alleviated. Of course, the damping material also could be used in conjunction with the other practical embodiments described in Sections 3 through 5 above to achieve the same effect.

In each of the embodiments discussed above, the response time of the Z-actuator is increased dramatically—often by a factor of ten-to-twenty. An at least somewhat commensurate increase in Z feedback loop bandwidth and a corresponding increase in scan rate are possible. This dramatic increase in scan rate is highly beneficial given the fact that there is an ever-increasing demand for higher speed scanning as metrology applications continue to expand from the laboratory and into industrial settings. Similar benefits are achievable in surface modification instruments and other microactuated devices.

Many changes and modifications may be made to the invention without departing from the spirit thereof. The scope of some of these changes are discussed above. The scope of other changes will become apparent from the appended claims.

We claim:

1. A method of operating an instrument comprising:
   (A) energizing a microactuator to translate an object with respect to a support structure to which said microactuator is coupled; and
   (B) during microactuator energization, at least substantially preventing momentum transfer from said microactuator to said support structure.

2. A method as defined in claim 1, wherein said microactuator comprises a piezoelectric actuator having first and second opposed ends, wherein said object moves with said first end of said piezoelectric actuator during the energizing step, and wherein the preventing step comprises coupling said piezoelectric actuator to said support structure such that, during the energizing step, said piezoelectric actuator translates said object without imposing any substantial net forces on said support structure.

3. A method as defined in claim 2, wherein said microactuator further comprises 1) a first deflectable mount which mounts said first end of said piezoelectric actuator on said support structure and 2) a second deflectable mount which mounts said second end of said piezoelectric actuator on said support structure, and wherein said first and second mounts deflect upon actuation of said piezoelectric actuator.

4. A method as defined in claim 3, wherein
   all structures which move upon movement of said first end of said piezoelectric actuator have a first combined mass M1, and all structures which move upon movement of said second end of said piezoelectric actuator have a second combined mass M2, wherein
   said first and second mounts have stiffnesses K1 and K2, respectively, wherein
   K1 is less than K2, and wherein
   the preventing step comprises satisfying the equation: $M1K1=M2K2$.

5. A method as defined in claim 4, wherein
   during piezoelectric actuator movement, said first and second ends of said piezoelectric actuator move at first and second velocities V1 and V2, respectively, and wherein
   the preventing step comprises satisfying the equation: $M1V1=M2V2$.

6. A method as defined in claim 5, further comprising determining the value of the mass M2 that satisfies the equation $M1V1=M2V2$ by altering the mass M2 while monitoring frequency response characteristics of said instrument to said alterations and ascertaining a mass M2 for which resonance and antiresonance are at least substantially avoided for a at least substantially full range of microactuator excitation frequencies.

7. A method as defined in claim 5, further comprising damping movement of said piezoelectric actuator via a damping material which contacts said piezoelectric actuator.

8. A method as defined in claim 2, wherein the preventing step comprises preventing the transfer of substantial momentum from said piezoelectric actuator to said support structure.

9. A method as defined in claim 2, wherein
   said piezoelectric actuator comprises a first piezoelectric actuator which imposes forces on said support structure during the energizing step, wherein
   said piezoelectric actuator further comprises a second piezoelectric actuator, and wherein
   the preventing step comprises energizing said second piezoelectric actuator during energization of said first piezoelectric actuator so as to impose forces on said support structure which 1) are essentially the same in magnitude as the forces imposed on said support structure by said first piezoelectric actuator and 2) essentially opposite in direction to the forces imposed on said support structure by said first piezoelectric actuator.

10. A method as defined in claim 1, further comprising damping movement of said microactuator via a damping material which contacts said microactuator.

11. A method as defined in claim 10, wherein said damping material is a polymer material.

12. A method as defined in claim 1, wherein said instrument comprises a probe-based measuring instrument, and further comprising:
   (A) scanning a surface of a sample with a probe of said instrument, wherein a translatable element comprising one of said probe and said sample is mounted on said microactuator and said microactuator is mounted on said support structure;
   (B) monitoring an effect of probe/sample interaction on said probe; and
   (C) energizing said microactuator under feedback control dependent on the monitoring step.

13. A method as defined in claim 12, wherein
   said microactuator comprises a Z actuator which displaces said translatable element along an axis relative to the sample, wherein
   said support structure comprises an XY actuator assembly which translates said translatable element in a plane extending orthogonally to said axis, and further comprising damping movement of said XY actuator assembly using a damping material which contacts said XY actuator assembly.

14. A method as defined in claim 1, wherein
   said microactuator imposes forces on said support structure during the energizing step, and wherein
   the preventing step comprises imposing forces on said support structure during the energizing step that are 1) at least essentially the same in magnitude as the forces imposed on said support structure by said microactuator and 2) at least essentially opposite in direction to the forces imposed on said support structure by said microactuator.

15. A method comprising:
   (A) scanning a surface of a sample with a probe, wherein a translatable element comprising one of said probe and said sample is disposed on an actuator assembly which is mounted on a support structure, said actuator assembly including a piezoelectric actuator having a first connection point on which said translatable element is supported and having a second connection point;
   (B) monitoring an effect of probe/sample interaction on said probe;
   (C) energizing said piezoelectric actuator under feedback control dependent on the monitoring step; and
   (D) during piezoelectric actuator energization, controlling interaction between said actuator assembly and said support structure to prevent the imposition of any substantial net forces on said support structure from said piezoelectric actuator, thereby increasing probe bandwidth by inhibiting induced resonances in said support structure.

16. A method comprising:
   (A) scanning a surface of a sample with a probe, a translatable element comprising one of said probe and said sample being supported on a first end of a piezoelectric actuator having first and second ends, said first end of said piezoelectric actuator being mounted on a support structure via a first deflectable mount, and said second end of said piezoelectric actuator being mounted on said support structure via a second deflectable mount,
   (B) monitoring an effect of probe/sample interaction on said probe;
   (C) energizing said piezoelectric actuator, under feedback control dependent on the monitoring step, so as to effect relative probe/sample movement so as to maintain at least one probe operational parameter essentially constant, wherein, during the energizing step, said first and second mounts deflect in opposite directions and said piezoelectric actuator expands without imposing any substantial net forces on said support structure, thereby increasing probe bandwidth by inhibiting the induction of resonances in said support structure.

17. A method as defined in claim 16, wherein all structures which move upon movement of said first end of said piezoelectric actuator have a first combined mass M1, and all structures which move upon movement of said second end of said piezoelectric actuator have a second combined mass M2, wherein
   during piezoelectric actuator movement, said first and second ends of said piezoelectric actuator move at first and second velocities V1 and V2, respectively, and wherein
   the masses M1 and M2 are set relative to one another so as to satisfy the equation: M1V1=M2V2.

18. A method as defined in claim 17, further comprising determining the value of the mass M2 that satisfies the equation M1V1=M2V2 by altering the mass M2 while monitoring frequency response characteristics of said probe to said alterations and ascertaining a mass M2 for which resonance and antiresonance are at least substantially avoided for a full range of piezoelectric actuator excitation frequencies.

19. An instrument comprising:
   (A) an actuator support structure;
   (B) an object; and
   (C) an actuator assembly on which said object is supported and which is supported on said actuator support structure, said actuator assembly including a microactuator which is configured to interact with said actuator support structure such that no substantial net forces are imposed on said actuator support structure by said microactuator upon energization of said microactuator.

20. An instrument as defined in claim 19, wherein said actuator assembly further comprises a deflectable mounting arrangement which connects said microactuator to said actuator support structure.

21. An instrument as defined in claim 19, wherein said microactuator comprises a piezoelectric actuator having at least first and second connection points.

22. An instrument as defined in claim 21, wherein said actuator support structure has a cavity formed therein in which said piezoelectric actuator is at least partially located, and wherein said actuator assembly further comprises a deflectable mount which extends from said piezoelectric actuator to a peripheral surface of said cavity.

23. An instrument as defined in claim 22, wherein said mount is a first deflectable mount which extends from said first connection point of said piezoelectric actuator to said peripheral surface of said cavity, and wherein said actuator assembly further comprises a second deflectable mount which extends from said second connection point of said piezoelectric actuator to said peripheral surface of said cavity.

24. An instrument as defined in claim 23, wherein both of said mounts have essentially the same stiffness.

25. An instrument as defined in claim 23, wherein said object is mounted on said first mount, wherein said second mount is stiffer than said first mount, and wherein said actuator assembly further comprises an additional mass which is provided on said second mount to render a combined mass M2 of said second mount and said additional mass that is significantly heavier than a combined mass M1 of said first mount and said object so that the ratio of M1 to M2 is at least substantially equal to a ratio of the stiffness of said first mount to the stiffness of said second mount.

26. An instrument as defined in claim 22, wherein said piezoelectric actuator is a first piezoelectric actuator having first and second connection points and said mount is a first deflectable mount, wherein said actuator support structure further comprises a relatively rigid beam which extends across said cavity and which has first and second opposed sides, wherein said second connection point of said first piezoelectric actuator is mounted on said first side of said beam and said object is mounted on said first connection point of said first piezoelectric actuator, wherein said actuator assembly further comprises 1) a second piezoelectric actuator which has a connection point which is mounted on said second side of said beam and 2) a second deflectable mount which extends from said second piezoelectric actuator to said peripheral surface of said cavity.

27. An instrument as defined in claim 22, wherein said actuator assembly further comprises a damping material which is disposed in said cavity in contact with said piezoelectric actuator.

28. An instrument as defined in claim 19, wherein said actuator assembly further comprises a damping material which contacts said actuator assembly.

29. An instrument as defined in claim 28, wherein said damping material comprises a polymer material.

30. An instrument as defined in claim 19, wherein said object comprises a probe for measuring a characteristic of a sample.

31. An instrument as defined in claim 30, wherein said microactuator comprises a Z actuator which displaces said probe along an axis relative to the sample, and wherein said actuator support structure comprises an XY actuator assembly which translates said probe in a plane extending orthogonally to said axis and on which said Z actuator is mounted.

32. An instrument as defined in claim 31, further comprising a polymer damper which contacts said XY actuator assembly.

33. An instrument as defined in claim 30, wherein said instrument is a scanning probe microscope.

34. An instrument comprising:
(A) an actuator support structure having a cavity formed therein;
((B) a sample support;
(C) a probe; and
(D) an actuator assembly on which said probe is supported and which is disposed at least partially within said cavity, said actuator assembly including
  (1) an actuator which is configured to displace said probe under feedback control in response to changes in probe operation due to probe/sample interaction, and
  (2) a deflectable mount which extends from said actuator to a peripheral surface of said cavity, wherein said actuator assembly is configured to interact with said actuator support structure and with the remainder of said instrument such that no substantial net forces are imposed on said actuator support structure by said actuator assembly upon energization of said actuator.

35. An atomic force microscope comprising:
(A) a frame;
(B) a sample support which is attached to said frame;
(C) a probe;
(D) a sensor which monitors operation of said probe and which generates a feedback signal;
(E) an XY actuator assembly which is mounted on said frame and which has a free end which is movable in an X-Y plane;
(F) a Z actuator assembly which is mounted on said free end of said XY actuator assembly and on which a translatable element is mounted, said translatable element comprising one of said probe and said sample support, said Z actuator assembly including a Z actuator which is configured to displace said translatable element under feedback control based on said feedback signal, in a Z direction orthogonal to said X-Y plane so as to maintain a designated probe operational parameter constant during relative probe/sample movement, wherein said Z actuator assembly is configured to interact with said XY actuator assembly such that no substantial net forces are imposed on said XY actuator assembly by said Z actuator assembly upon energization of said Z actuator.

* * * * *